United States Patent [19]

Brandstetter et al.

[11] Patent Number: 5,255,362

[45] Date of Patent: Oct. 19, 1993

[54] PHOTO STIMULATED AND CONTROLLED IMAGING NEURAL NETWORK

[75] Inventors: Robert W. Brandstetter, Levittown; Nils J. Fonneland, Ronkonkama, both of N.Y.

[73] Assignee: Grumman Aerospace Corporation, Bethpage, N.Y.

[21] Appl. No.: 391,471

[22] Filed: Aug. 9, 1989

[51] Int. Cl.$^5$ .............................................. G06F 15/62
[52] U.S. Cl. .................................... 395/163; 395/25; 382/15
[58] Field of Search .............................. 364/518-522, 364/513, 713; 395/25, 163, 162; 382/14, 15

[56] References Cited

U.S. PATENT DOCUMENTS

| | | | |
|---|---|---|---|
| 4,815,027 | 3/1989 | Tokumitsu et al. | 395/25 |
| 4,821,222 | 4/1989 | Arrathoon | 395/25 |
| 4,842,370 | 6/1989 | Brenner et al. | 364/713 X |
| 4,926,366 | 5/1990 | Cuykendall et al. | 364/713 |
| 4,937,776 | 6/1990 | Myers et al. | 364/713 X |
| 4,988,891 | 1/1991 | Mashiko | 364/513 X |
| 5,008,833 | 4/1991 | Agranat et al. | 395/25 |
| 5,095,459 | 3/1992 | Ohta et al. | 395/25 |
| 5,099,434 | 3/1992 | Stoll et al. | 364/713 X |
| 5,129,040 | 7/1992 | Hanazato et al. | 395/25 |

OTHER PUBLICATIONS

"Artificial Neural Networks" by John J. Hopfield, IEEE Circuits and Devices Magazine, Sep. 3, 1988.
"Computing with Neural Circuits" by John J. Hopfield et al. Science, vol. 233, Aug. 8, 1986.
"Neural Network and Physical Systems with Emergent Collective Computational Abilities" by John J. Hopfield, vol. 79, pp. 2554-2558.
"An Optically Programmed Neural Network" by C. D. Kornfeld et al. AT&T Bell Laboratories Murray Hill, New Jersey 07974.
"Neurons with Graded Response Have Collective Computational Properties Like those of Two-State Neurons" by John J. Hopfield, vol. 81, pp. 3088-3092.
"Computational Neuroscience" by Terrence J. Sejnowski, vol. 241.

Primary Examiner—Heather R. Herndon
Assistant Examiner—Almis Jankus
Attorney, Agent, or Firm—Scully, Scott, Murphy & Presser

[57] ABSTRACT

A photo stimulated and controlled imaging neural network for providing self generating learning sets and associative memory and programmability. An image to be recognized or detected is transferred to an imaging plane, which can be as simple as a lens or as complicated as a cathode ray tube. The imaging plane whose contents forms the input for a photo receptor array transfers the stimulus from the object to the photoreceptor array. The photoreceptor array responds to the stimulus provided by the imaging plane with various couplings between an array of neuron amplifiers. The photo receptor array comprises a plurality of synaptic photo controlled resistors which respond to the stimulus provided by the imaging plane. The individual neuron amplifiers settle into a set of on or off binary states based on the couplings of the photo controlled resistors which comprise the receptor array. The output states are equally weighted and as a whole constitute a particular learning set which is then passed onto a gate array where it can be utilized to make various decisions.

59 Claims, 9 Drawing Sheets

PHOTO STIMULATED AND CONTROLLED IMAGING NEURAL NETWORK

BACKGROUND OF THE INVENTION

1. Field of the Invention

This invention relates to artificial neural networks and neurocomputing systems for information processing, and more particularly, to photo stimulated imaging neural networks for providing self generating learning sets and associative memory and programmability. The self generating learning sets and associative memory and programmability are essential features for solving recognition and identification type problems associated with advanced robotics and control systems.

2. Discussion of the Prior Art

Standard computing or information processing systems at present are based on various implementations of the Von Neumann architecture. This type of information processing system relies on algorithms for implementing the various functions required for solving a particular problem. In order for the particular problem to be solved by the information processing system or computer, an individual; namely, a computer programmer must fully understand the particular problem and then be able to create an algorithm or series of algorithms capable of logically calculating a solution to the particular problem. Basically, the computer system is a "dumb" system that does not think for itself, but rather logically implements in a step-by-step process the instructions associated with a given algorithm to arrive at a solution. Although computers are "dumb", they are capable of many rote calculations per micro second and are therefore extremely useful in many applications. The inherent problem with this type of computing system is that the programmer must first theoretically solve or formulate functions to solve the specific problem if at all possible before the number crunching capabilities of the computer can be utilized. A second but associated problem is if the specific task or problem cannot be solved with a series of logical steps or arithmetic steps that will conclude with a solution to the particular problem. Even in cases where the complete function or task associated with a given problem is known it can still be impossible to develop an algorithm to implement the function in a certain case of problems because infinite examples exist. Such is the case, for example, for automobile autopilots, speech and handwriting translators, and identification systems for enemy aircraft or the like.

While computing capabilities and computers have advanced to solve a wide range of problems providing extraordinary speed, accuracy and convenience, the computer in many instances is still unable to solve the general class of problems associated with recognition and identification. In addition, standard computers do not have the ability to adapt to new and changing situations or learn on the fly. These types of problems limit the development of advanced robotics and control systems. However, in higher order biological systems recognition and identification functions are relatively simple tasks.

Neurocomputing is a new form of information processing which is emerging as a recognized alternative to the Von Neumann architecture. Neural computers are basically non-programmed adaptive information processing systems capable of developing associations between objects in response to their environment, as opposed to carrying out or implementing step-by-step procedures outlined by an algorithm. The neurocomputer generates its own rules governing the aforementioned association, refines these rules based on its own examples, and learns from its mistakes through this type of trial and error processing. Basically, the neurocomputer is trying to emulate the operation of a human brain in its most elemental form. The human brain is an extraordinary computing and information processing system which is particularly well suited for recognition type problems. While standard digital computers are far better suited to solving computational problems, the neurocomputers are best suited for solving complex pattern recognition problems inherent in target determination problems, continuous speech recognition, and handwriting analysis type problems.

Whereas the operation of the standard digital computer is well known, the operation of the human brain can only be characterized by gross observations and functions; therefore, the present state of neurocomputing has progressed to the point of utilizing basic circuits for implementing small associative memories and programmability. The associative memory and programmability in its simplest sense is one of being able to locate and retrieve data from various locations without having a specific address for the location or exactly what is to be located. In other words, the neurocomputer functions as the human brain does in attempting to recall from memory certain events by associating it with other events. This type of memory and programmability allows for more easily recognizing objects or patterns without exactly knowing what the object or pattern is.

The prior art contains a variety of papers and articles dealing with the neurocomputing area. The article "Artificial Neural Networks" by John J. Hopfield, IEEE Circuits and Devices Magazine 8755-3996/88/0900-0003 discusses the limitations associated with standard digital computers for recognition type problems and the advantages of neuro systems for solving the same type of problem. The article further discloses the basic Hopfield network which consists essentially of a set of amplifiers with sigmoid input/output characteristics, an input capacitance, an output resistance and a plurality of resistive connections. This electrical model of a neurobiological network is one of the basic building blocks for neuro computing networks. In the article "Computing with Neural Circuits" by John J. Hopfield et al., Science, Volume 233, Aug. 8, 1986, Hopfield et al. discusses recent work which is directed to how particular computations can be performed by utilizing an appropriate pattern of neuron amplifiers synaptically coupled in a simple dynamic model system. The basic premise behind the article is that a model of non-linear neuron amplifiers which have been organized into a network with symmetric connections has a natural capacity for solving optimization problems. The key to operation of the Hopfield network is high interconnectivity between the electrical components. The basic network consists essentially of the same elements as the aforementioned Hopfield article. In a third article "Neural Network and Physical Systems with Emergent Collective Computational Abilities", by John J. Hopfield, Proceedings National Academy of Science, Vol. 79, pp. 2554–2558, April 1982, Hopfield discusses a third aspect of neural networks in that the memory of these neural networks are retained as the stable states that the neural amplifiers of the neural network eventually settle into. Hopfield suggests that the link between simple electrical circuits and the complex computational properties of high order nervous systems may be the emergence of new computational capabilities from the collective behavior of a large number of simple processing elements such as the single neuron or neuron amplifier. The three Hopfield articles discuss and deal with a simple working model of the basic neural network utilizing standard electrical components.

Developments in artificial neural networks have offered new and useful concepts and in particular as presented by the three aforementioned articles, it has been shown that by high impedance coupling (soft coupling) with positive (enabling) feedback and negative (inhibitory) feedback in an array of amplifiers each having sigmoid transfer characteristics (remote cutoff and saturation) it is possible to mimic the biological neural system. A set of input conditions applied produces analog level transitions which are coupled into and between other amplifiers resulting in a dynamically changing set of levels which eventually settle into quasi stable states in either saturation or cutoff as effected by sigmoid responses. These states being unique to the given input data set can then by viewed as representing a learning set for that particular input. For a new input data set the artificial neural network is again initialized and run to exhibit a new learning set and so on.

The major difficulty and drawback to the aforementioned neural networks is that they can require a large number of discrete electrical inputs (dendrites) one for each amplifier (neuron). This makes it necessary to provide the required signal wire connections, processing and encoding of signals to satisfy the particular artificial neural network. In addition, the enabling and inhibitory functions which are controlled by the coupling resistors (synapses) must be changed for different input data sets requiring the resistors be set to new valves. Also, the input image data must be processed before entering the particular artificial neural network. The present invention avoids the drawbacks and difficulties presented in the prior art artificial neural networks by providing for the direct imaging and transfer of physical of sensor derived data and in the process, providing synaptic couplings which change and respond to the imaged data thereby avoiding the need to change valves.

The paper "An Optically Programmed Neural Network" by C. D. Kornfeld et al. presented at the IEEE SPIE conference in San Diego, Calif. on Jun. 18, 1988 discloses an approach as the name indicates for an optically programmed neural network which in combination with an external computer in a closed loop system calculates the network couplings by a convergent iterative process. Basically, the paper deals with the design, construction and operation of a hybrid electro-optic computer for use in neural networks. The system is designed around a photosensor array. The array in conjunction with its summing amplifiers constitutes a simple element performing the multiplication that is required by any neural network. The system has a computer incorporated into the loop between the input and output, and which is used to control and configure the array. The computer contains an optical program which implements a Hopfield style iterative memory. The present invention; however, is uniquely different in that it functions with a photo imaging and controlled coupling neural network to learn new images and detect them later by this learning set. The novel concept of the present invention is that it works directly with images that are impressed onto a photo receptor array to form unique weight, couplings and connectivity between neuron amplifiers to produce neural-like learning sets of stable amplifier states.

SUMMARY OF THE INVENTION

The present invention is directed to a photo stimulated imaging neural network for providing self generating learning sets and associative memory and programmability. The basic network comprises an imaging means which provides physical or sensor derived stimulus data from a given object or pattern to a photo receptor array means. The photo receptor array means consists of a plurality of synaptic photo controlled resistors. These synaptic photo controlled resistors respond to the stimulus from the photo receptor array means with a given resistance value. The output of the photo receptor array means is connected to a neuron amplifier array which is comprised of a plurality of individual neuron amplifiers. The neuron amplifiers are coupled to each other in a specific pattern determined by the resistance of the individual synaptic photo controlled resistors. In addition, the neural network further comprises a photo interconnect and response array which provides for the connectivity and temporal control of the entire network. The photo interconnect array responds to the output of a photo stimulus means which outputs a pattern or specific blue print for the connectivities and response times for the network. The photo interconnect and response array can exist as a separate element in the network or rather as part of the photo receptor array.

An input object or pattern which is to be recognized or detected is transferred to the imaging means which could be as simple as a lens or as complicated as a cathode ray tube. The imaging means whose content forms the input for the photo receptor array transfers the stimulus from the object to the photo receptor array. The photo receptor array means as stated before is comprised of a plurality of synaptic photo controlled resistors. These photo controlled resistors respond to the intensity and wave length of light directed by the imaging means onto the photo receptor array means. In the present invention, the photo controlled resistors increase in resistance as the intensity of light diminishes and decrease in resistance as the intensity of light increases, therefore, for a given pattern of light impinging on the photo receptor array means, various resistance values are established by the individual synaptic photo controlled resistors thereby establishing a particular coupling and feedback pattern for the individual neuron amplifiers. The level of resistance for all the photo controlled resistors is equal for a given value of light intensity. The photo receptor array means is also connected to a voltage supply means through a plurality of photo controlled current limiting resistors. The voltage supplied by the voltage supply means provides power for the individual neuron amplifiers. The power supplied is distributed by the coupling and feedback pattern established by the synaptic photo controlled resistance.

The voltages which appear at the output of the photo receptor array and are supplied to the inputs of the individual neuron amplifiers are commonly referred to as the electrical dendrite input signals because they are distributed by the synaptic photo controlled resistors. Each individual neuron amplifier has a single input and two outputs, one is as enabling positive feedback signal, and the second is an inhibitory negative feedback signal. Both the inhibitory and enabling feedback signals are fed back to the other neuron amplifiers through the couplings established by the synaptic photo controlled resistors, however, they are not fed back to the particular neuron amplifier from which they originate. The plurality of individual neuron amplifiers are connected on the output end, by means of the enabling positive feedback signal, to a gate array means. For a given pattern or object, the individual neuron amplifiers eventually settle into stable states as determined by the unique coupling and feedback pattern established by the synaptic photo controlled resistors. The rate at which their individual neuron amplifiers settle into their respective stable states is determined by the firing rate time constants and sigmoid response of each of the individual neuron amplifiers.

The stable states or axon output signals supplied by the plurality of individual neuron amplifiers to the gate array means constitutes a particular learning set. Each individual axon output is equally weighted in relation to other axon outputs. The learning set stored in the gate array means can arrange this programmable gate such that when a similar image appears sometime later it will produce a one for each memory coincidence and a zero for each memory difference. There are numerous patterns and functions that the learning set can program and thus establish true associative memory and programmability.

By controlling the firing rate time constant, the duration of time associated with the individual neuron amplifiers reaching steady-state outputs can be manipulated thereby providing the network with full temporal control. By controlling the connectivities of the individual neuron amplifiers, the number of states for a given learning set can be established. The sigmoid response of the individual neuron amplifiers is necessary in order to achieve more neurobiological like effects for the neuron amplifier because the sigmoid response for the neuron amplifier provides the neuron amplifier with saturation and cutoff characteristics which mimic the on and off states of a true biological neuron. The firing rate time constant and sigmoid response of each of the individual neuron amplifiers can be achieved using standard photo-electric elements and standard electrical components placed in the local feedback path of each of the individual neuron amplifiers. A second approach would have the firing rate time constant along with the control connectivities of each of the individual neuron amplifiers be achieved using standard photo-electric elements in the photo interconnect and response array. A third alternative would be to combine all the aforementioned functions into one photo receptor/photo interconnect and response array means as stated previously.

The photo stimulated and controlled imaging neural network of the present invention provides for the accurate generation of a true associative memory and programmability for use in information processing systems that can be used to solve complex recognition and identification type problems. In addition, the network has the ability to adapt to various situations of stimuli and learn on the fly. The network, by applying a novel pluralistic opto-electronic concept incorporating an imaging element and dynamic temporal response control in an artificial neural network architecture offers the means for direct imaging and transfer of physical or sensor derived data into the network thus encorporating parallel data entry, self generating learning sets, and associative memory and programmability. The network of the present invention avoids the need for external electrical input signals thereby eliminating the signal conditioning and wire connections required in standard artificial neural networks. Working directly from input images, it also eliminates the need for electrically altering or physically changing the synaptic coupling resistors which in this case are photo controlled. The body of neuron amplifiers respond to a photo initiated stimulus through an imaging array of photo receptors which simulates the operations of a biological neural network. Through the image these receptors provide variable feedback and synapse-like interconnections to arrive at a learning state that defines the source of the photo stimulus as for example that derived from a two dimensional image.

The uniqueness and utility of the network of the present invention comes from the fact that interfacing with the network merely requires that a data input be imaged radiometrically (e.g. an optical interface) onto the photo receptors for a parallel data transfer with no electrical signal processing or wire connections required. The term radiometrically is becoming a term of art in this field and is defined to include the emitted or reflected region of the electromagnetic spectrum. The functions performed by the network are similar to a biological neural network in that all the neurons receive stimulus directly through synaptic couplings with enabling and inhibitory functions that are provided by the photo receptors. The network of the present invention has applications in recognition and identification problems associated with advance robotics and control system as well as the complex pattern recognition problems implicit in understanding continuous speech, identification of handwritten characters and target determination.

BRIEF DESCRIPTION OF THE DRAWINGS

For the purpose of illustrating the invention, there is shown the drawings the forms which are presently preferred; however, it should be understood that the invention is not necessarily limited to the precise arrangements and instrumentalities here shown.

DESCRIPTION OF THE PREFERRED EMBODIMENT

Figure 1:
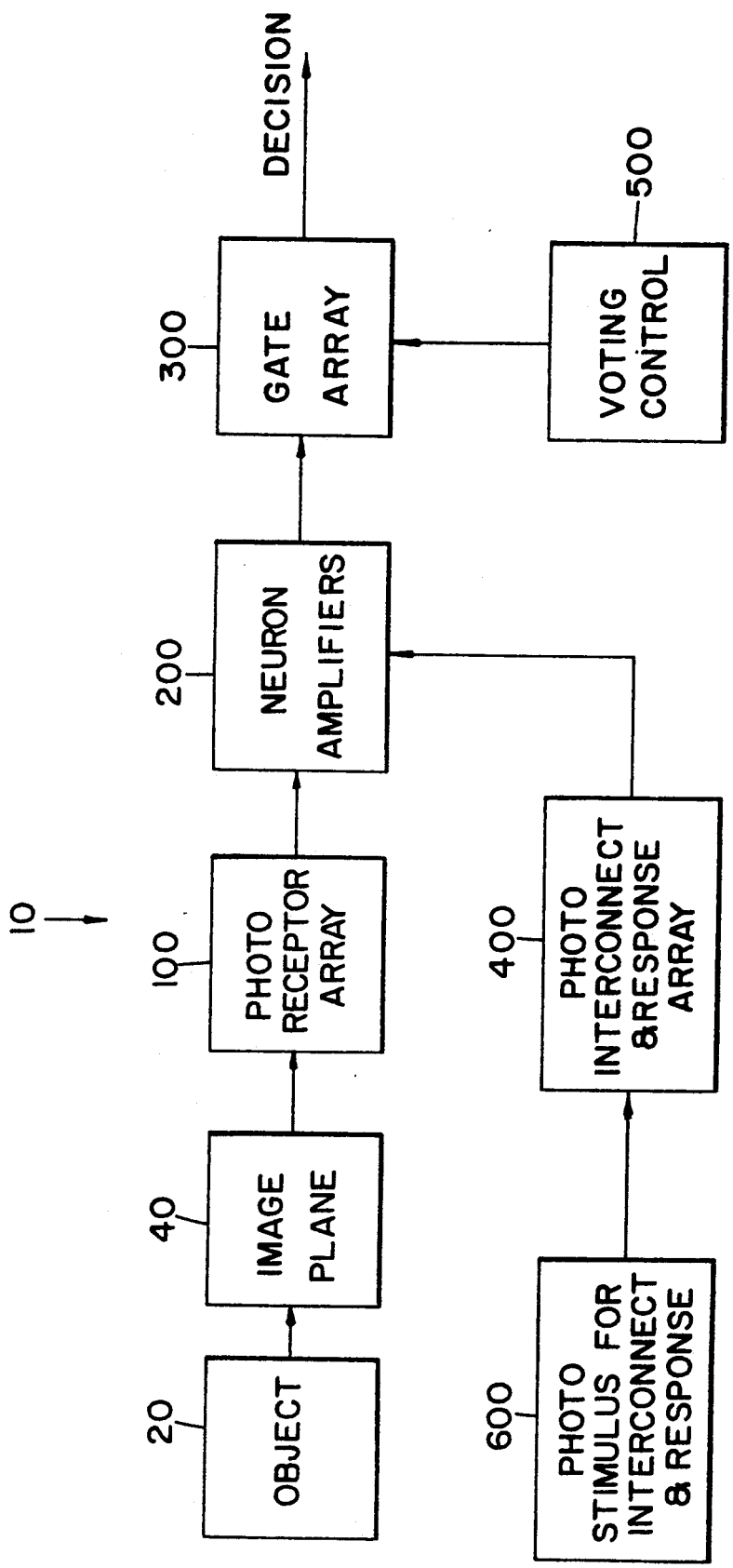
FIGS. 1 and 1a are block diagrams of the photo stimulated imaging neural network of the present invention.

The photo stimulated and controlled imaging neural network provides functions which are similar to a biological neural network in that all the neuron amplifiers (neurons) receive stimulus (dendrites) directly and through synaptic couplings (synapses) with enabling and inhibitory functions that are provided by the photo receptors. Referring to FIG. 1, there is shown a block diagram of the photo stimulated and controlled imaging neural network 10. An object 20 which is to be recognized or detected is transferred to an imaging means 40 whose content forms the input for the photo receptor array means 100. The imaging means 40 can be a lens, a cathode ray tube (CRT), an image intensifier, a laser scanner, or any means for direct imaging and transfer of physical or sensor derived data into the network 10 through the photo receptor array means 100 thereby providing parallel data entry to the network. The data from the imaging means 40 is radiometrically imaged onto the photo receptor array means 100 wherein the data is converted into a plurality of electrical dendrite input signals. The photo receptor array means 100 is comprised of a plurality of individual synaptic photo controlled resistors. The photo controlled resistors can be cadmium sulfide resistors, photo field effect transistors, bipolar photo transistors, or photo diodes. The light from the imaging means 40 impinging upon the photo receptor array means 100 controls the synaptic weights and couplings between the individual neuron amplifiers which comprise the neuron amplifier array means 200. Basically, the photo receptor array means 100 serves as the feedback and coupling means for the individual neuron amplifiers and through the unique pattern of resistance established by the light pattern from the imaging means 40, the synaptic photo controlled resistors provide a synaptic blue print for the individual neuron amplifiers. A voltage supply means is connected to a first side of the photo receptor array means 100 and provides an operating voltage for the individual neuron amplifiers through the unique coupling pattern established by the resistances of the synaptic photo controlled resistors. The various voltage values that reach the neuron amplifier array means 200 which is connected to a second side of the photo receptor array means 100 are electrical dendrite input signals.

The neuron amplifier array means 200, as stated previously, is comprised of a plurality of individual neuron amplifiers, and provides a plurality of axon output signals to a gate array means 300 in response to the plurality of electrical dendrite input signals from said photo receptor array means 100. Each of the individual neuron amplifiers has an inhibitory negative feedback axon output and an enabling positive feedback axon output, and for each individual neuron amplifier, the enabling and inhibitory axon outputs are coupled to all remaining neuron amplifiers, but not to the neuron amplifier from which they originate thus resulting in one less coupling than there are neuron amplifiers. The intense feedback provided by the photo receptor array means 100 combined with the variability of the input image of object 20 causes the individual neuron amplifiers to respond to pattern changes and settle into a set of stable states. The individual neuron amplifiers settle into these stable states in a non-linear fashion which is a function of the firing rate time constant and the sigmoid response characteristic of each of the individual neuron amplifiers. The predetermined firing rate time constant determines the response times of the individual neuron amplifiers and can be provided through a parallel network consisting of a resistor and capacitor which are both photo controlled. The parallel network can be located in either the photo receptor array means 100 circuitry or in the photo interconnect and response array means 400 circuitry. The sigmoid response is provided by a local parallel feedback network located in the local feedback path of each of the individual neuron amplifiers. The set of stable states provided by the individual neuron amplifiers constitutes a specific learning set and is provided to the gate array means 300 through the enabling positive feedback axon outputs of the individual neuron amplifiers.

The axon outputs are a set of stable on or off binary states and insofar as position or level are equal contributors to the outcome of the network 10. These equally weighted terms that comprise the learning set are stored in the memory portion of the gate array means 300. The learning set can thus arrange the gate array means 300 such that when a similar image appears sometime later, it will produce a one for each memory coincidence and a zero for each memory difference. A control means 500 provides control for the gate array means 300 and provides various schemes for utilizing and arranging the learning sets in the gate array means 300. Basically, a set of input conditions applied to the photo receptor array means 100 from the imaging means 40 produces analog level transitions which are coupled into and between the individual neuron amplifiers by the synaptic photo controlled resistors of the photo receptor array means 100 resulting in a dynamically changing set of levels which eventually settle into stable states in either saturation or cutoff as effected by the sigmoid response of each individual neuron amplifier. These states being unique to the given input data set can then be viewed as representing a learning set for that particular input.

The photo interconnect and response array means 400 provides for the connectivities between the individual neuron amplifiers thereby determining the overall topography of the network 10. In addition, as stated previously, the photo interconnect and response array means 400 can provide for the temporal control of the network 10 by incorporating the parallel resistor/capacitor network which provides the predetermined firing rate time constant. The photo interconnect and response array means 400 controls the connectivities of the individual neuron amplifiers by incorporating a neuron amplifier disconnect means into the neuron amplifier circuitry. The neuron amplifier disconnect means comprises a pair of photo controlled resistors in the input and output paths of the individual neuron amplifiers and through the controlled use of light, the resistance of the photo controlled resistors can be made high enough to effectively remove any or all of the individual neuron amplifiers from the network 10. By controlling the connectivities of the individual neuron amplifiers, the number of individual stable states which constitutes the specific learning set can be determined. Alternatively, the neuron amplifier disconnect means can also be some type of standard switching circuit or device capable of opening the circuit path of any of the individual neuron amplifiers upon command. The light used to control the photo interconnect and response array means 400 is provided by a photo stimulus means 600 which can be computer controlled. The photo interconnect and response array means 400 would be initialized by setting all interconnects and neuron amplifier time constants at some fixed configuration. Other temporal and/or spatial controls can eminate from stimulus utilizing a suitable source of light or radiance such as a light valve or CRT. The photo interconnect and response array means 400 is not necessary for a fixed network 10.

The photo stimulus means 600 can be programmed to provide a light stimulus to the photo interconnect and response array 400 which is different than the wavelength of light derived from the input image as well as a light stimulus with equal wavelength. This ability to modify the wavelength of the light stimulus allows a wider range of control of the network 10 while eliminating the possibility of interaction or overlap of the two different stimulus signals.

Figure 1A:
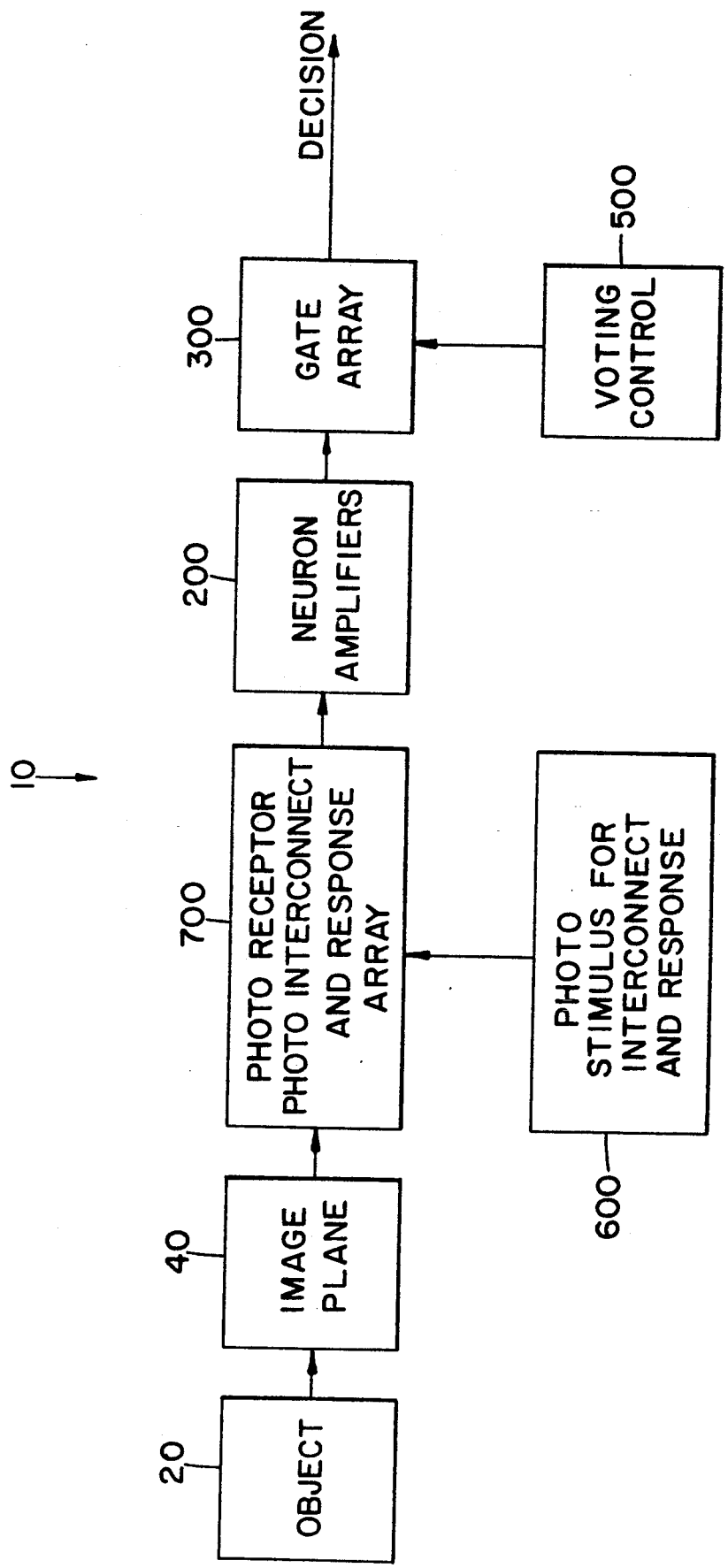

In a second embodiment of the invention, illustrated in FIG. 1a the photo receptor array means 100 and the photo interconnect and response array means 400 can be combined into a single array. FIG. 1a shows a block diagram of the photo stimulated and controlled imaging neural network 10 with the aforementioned array combined into a single photo receptor/photo interconnect and response array means 700 which provides all the functions that the original separate arrays provided. The two arrays 100 and 400 are combined for the purpose of providing for a more compact system.

Figure 2:
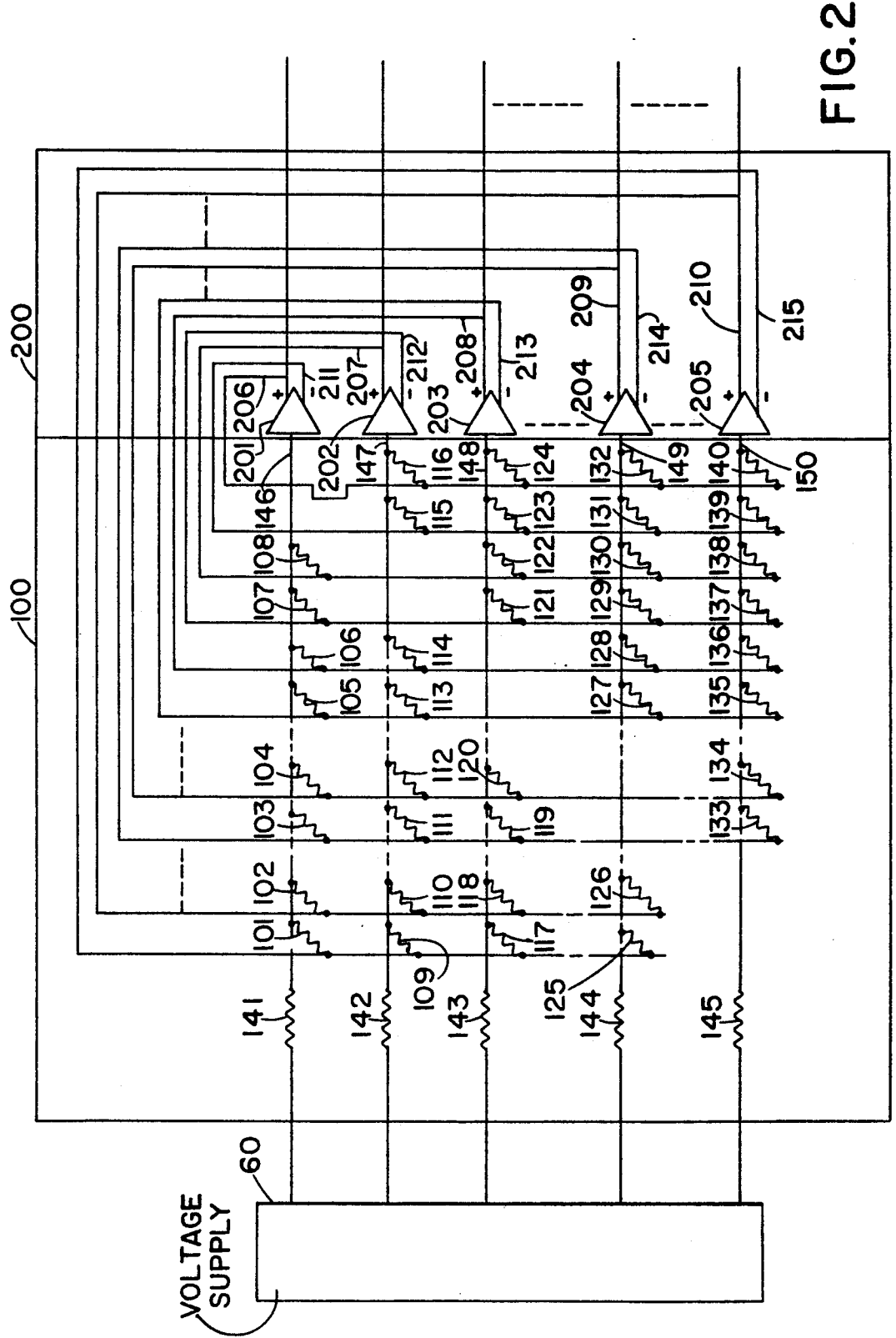
FIG. 2 is a schematic representation of the photo receptor array of the present invention.

Referring now to FIG. 2, there is shown a circuit diagram of the photo receptor array means 100 along with the neuron amplifier array 200 and voltage supply means 60. For the purposes of illustrating the present invention, a n×n photo receptor array means 100 and a n×1 neuron amplifier array means 200 is chosen. The nxn photo receptor array means 100 is comprised of synaptic photo controlled resistors 101-140, and current limiting resistors 141-145. The photo receptor array means 100 which emulates biological synaptic couplings is coupled to the neuron amplifier array means 200 through electrical dendrite input signal lines 146-150 which carry the electrical dendrite input signals to the neuron amplifiers 201-205. As stated previously, and as can be seen from FIG. 2, the individual synaptic photo controlled resistors 101-140 provide the couplings between the individual neuron amplifiers 201-205 and provide feedback to each of the individual neuron amplifiers 201-205. As can be seen from the pattern of synaptic photo controlled resistors 101-140, the enabling positive feedback axon outputs 206-210 and the inhibitory negative feedback axon outputs 211-215 are coupled to all other individual neuron amplifiers 201-205 through the synaptic photo controlled resistors 101-140. Since each individual neuron amplifier 201-205 receives feedback from the other individual neuron amplifiers 201-205 and not from itself, then if n is the total number of neuron amplifiers, then there will be n−1 pairs of couplings, and since there are two axon output couplings per neuron amplifier then the number of axon output couplings is 2(n−1) and the total number of couplings between the photo receptor array means 100 and the neuron amplifier array means 200 is given by $$C_t = 2n(n-1). \quad (1)$$

In this embodiment of the invention, cadmium sulfide resistors are utilized as the synaptic photo controlled resistors 101-140. Each of the synaptic photo controlled resistors 101-140 responds to the incident radiation wavelength and intensity provided by the imaging means 40, shown in FIG. 1, with a specific value of resistance which in turn controls the feedback and coupling between the individual neuron amplifiers 201-205. The relationship between the photo receptor array 100 and the imaging means 40 is best expressed as a mathematical relationship between the resistance of the synaptic photo controlled resistors 101-140 and the light or radiation pattern from the imaging means 40. A photo stimulated resistance matrix, Rp, is formed, which represents the resistive values of the elements of the photo receptor array 100 in response to the incident light or radiation pattern from the imaging means 40 received by an image matrix, Ir. Each element of Rp is related to each element of Ir by a conversion matrix, C, such that $$[Rp] = [C][Ir]. \quad (2)$$

The conversion matrix, C, represents the physical properties of the resistive elements and provide the resistive elements with a given value of resistance for a given intensity and wavelength of radiation. Using cadium sulfide resistors provides for an inverse relationship between light intensity and resistance such that the greater the intensity of incident radiation, the lower the resistance, and the lower the intensity of incident radiation, the greater the resistance.

The voltage supply means 60 provides the operating voltage for the individual neuron amplifiers 201-205 through current limiting photo controlled resistors 141-145 Resistors 141-145 are photo controlled to vary the voltage entering the system, as opposed to fixed resistors which would not allow this extra manipulation or control of the network 10. The light or radiation which determines the resistive values of resistors 141-145 is supplied from the imaging means 40. The voltages supplied from the voltage supply means 60 travels through the different paths determined by the synaptic photo controlled resistors 101-140 and eventually end up at the inputs to the individual neuron amplifiers 201-205. These voltage input signals as stated previously are the electrical dendrite input signals.

The intense feedback provided by the synaptic photo controlled resistors 101-140 of the photo receptor array 100 combined with the variability of the input image causes the neuron amplifiers 201-205 to respond to pattern changes and settle into new stable states. The settling into these new stable states occurs in a non-linear fashion as stated previously and is a function of the firing rate time constant of the individual neuron amplifier and its sigmoid response. As is shown in FIG. 2, the neuron amplifiers 201-205 are special amplifiers with single inputs and double outputs. These special amplifiers are chosen specifically for this type of application because of the double outputs, wherein one is a positive valued output and the second is a negative valued output. The neuron amplifiers 201-205 can also be standard operational amplifiers wherein the single output can be divided into two signal lines with one of the lines going to an inverter. As stated previously, the positive and negative outputs are enabling and inhibitory axon outputs that simulate the true enabling and inhibitory functions of a biological neural network.

Figure 3A:
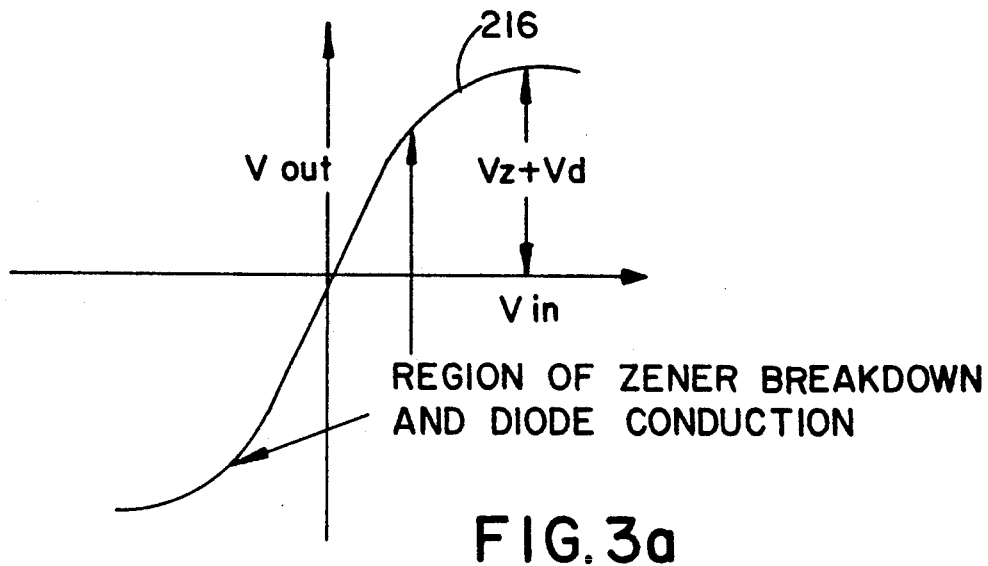
FIG. 3a is a representation of the sigmoid response characteristic of the neuron amplifiers of the present invention.
Figure 3B:
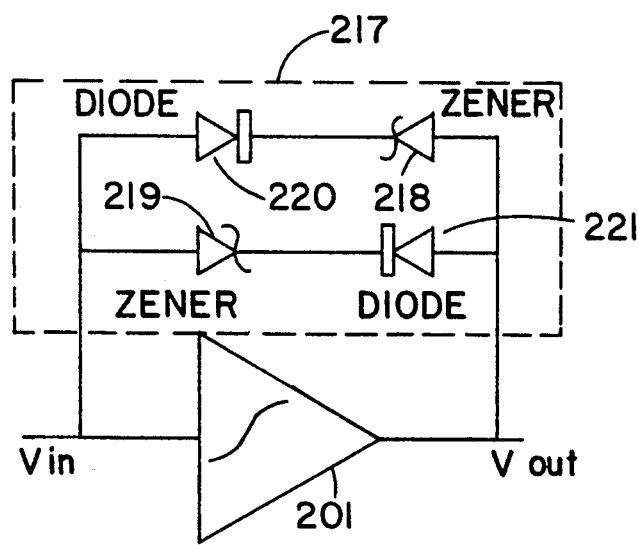
FIG. 3b is a circuit diagram of an individual neuron amplifier with zener limiting.

Turning now to FIGS. 3a and 3b, there is shown a typical sigmoid response curve 216 for voltage-in-voltage-out for neuron amplifier 201. A local, parallel feedback network 217, is used to achieve this type of response, and is attached to the individual neuron amplifier 201. The sigmoid response as shown by curve 216 provides the individual neuron amplifier 201 with remote cutoff and saturation transfer characteristics which simulates the response and firing rate of a biological neuron. The network 217 which resides in the local feedback path of neuron amplifier 201 consists of two parallel diode/zener diode branches conducting current in opposite directions. Basically, the network 217 provides zener diode limiting in the local feedback circuit of neuron amplifier 201. The zener diodes 218 and 219 set up voltages with opposite polarity, the single diodes 220 and 221 serve to isolate the two loops and in conjunction with the zener diodes 218 and 219 they generate the desired non-linear saturation and cutoff characteristic shown in FIG. 3a. Neuron amplifier 201 with network 217 exhibits a linear response for low level inputs, but for high level operation shifts to a non-linear region exhibiting remote cutoff and saturation characteristics. As stated previously, network 217 resides in the local feedback path of each of the individual neuron amplifiers 201-205, and thus are part of the neuron amplifier array means 200 although not shown in FIG. 2.

Figure 4:
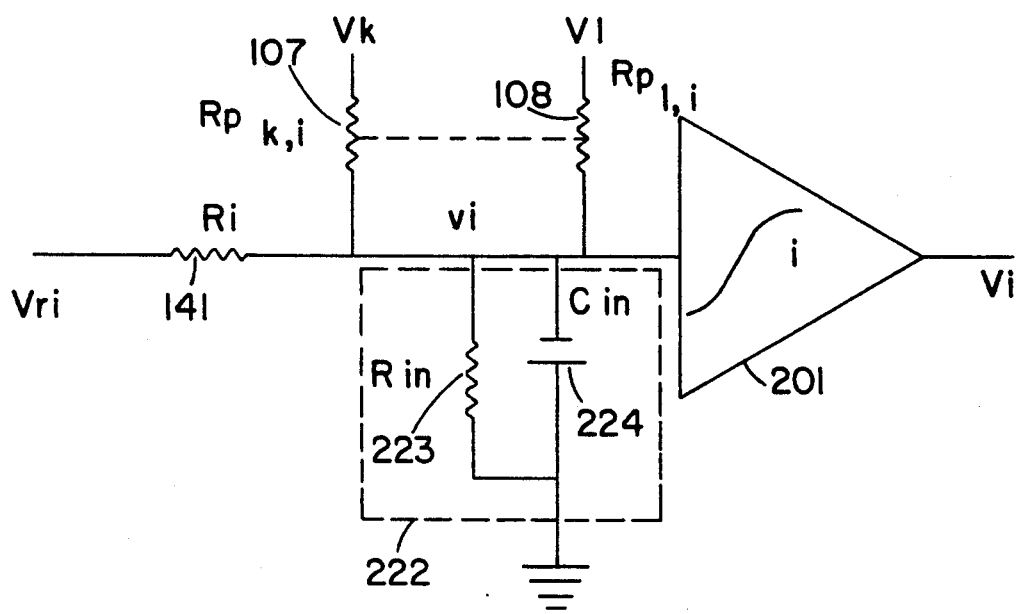
FIG. 4 is a circuit diagram of an individual neuron amplifier with synaptic photo controlled resistor coupling and associated RC time constant elements.

FIG. 4 illustrates how neuron amplifier 201 is connected into the photo receptor array means 100, and it also includes the parallel network 222 which consists of an input resistor 223 and an input capacitor 224. The resistance of input resistor 223 and the capacitance of input capacitor 224 provides the predetermined firing rate time constant of the neuron amplifier 201 as an RC time constant. The resistor 223 and capacitor 224 are both photo controlled devices resulting in a totally photo controlled firing rate time constant. This is accomplished by having input resistor 223 be a photo controlled resistor which can be of the same type as the synaptic photo controlled resistors 101-140 shown in FIG. 2, and by having input capacitor 224 be a photo controlled depletion layer capacitance of a pn junction. Synaptic photo controlled resistors 107 and 108 provide feedback and coupling from neuron amplifier 202 as shown in FIG. 2. Current limiting photo controlled resistor 141 provides a current limiting function on the voltage supplied by voltage supply 60. The source of light which controls these photo controlled devices is supplied by the imaging means 40 shown in FIG. 1.

Figure 5A:
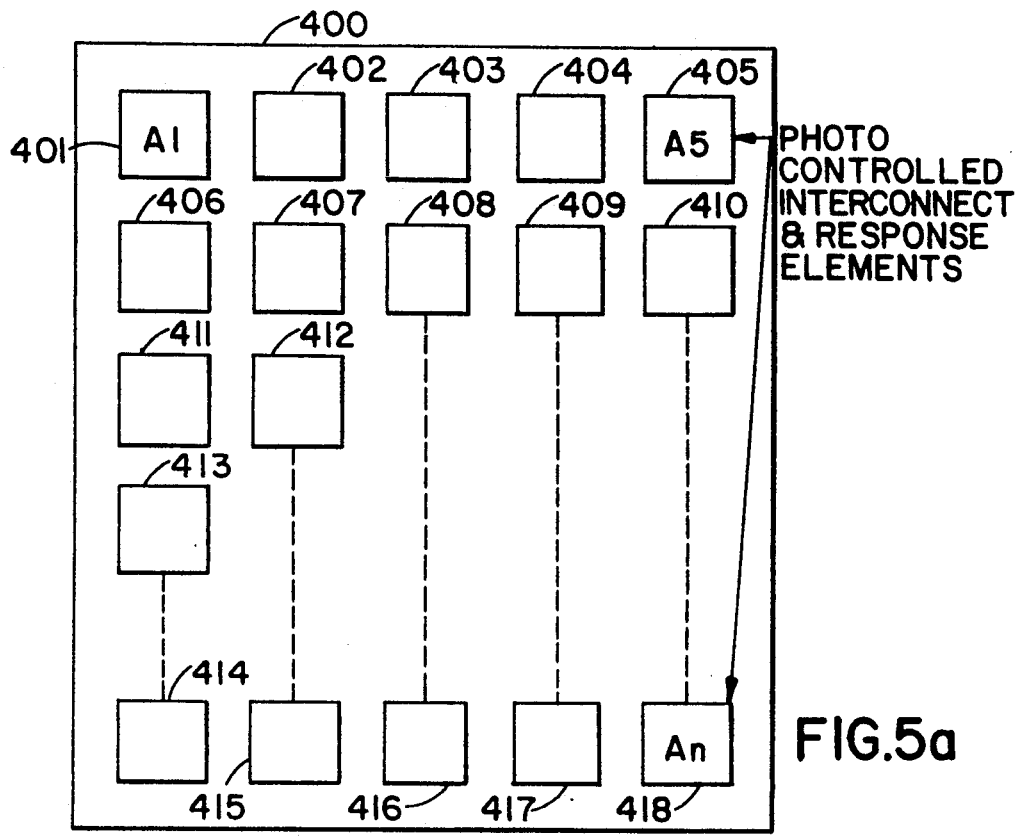
FIG. 5a is a diagrammatic representation of the photo interconnect and response array of the present invention.
Figure 5B:
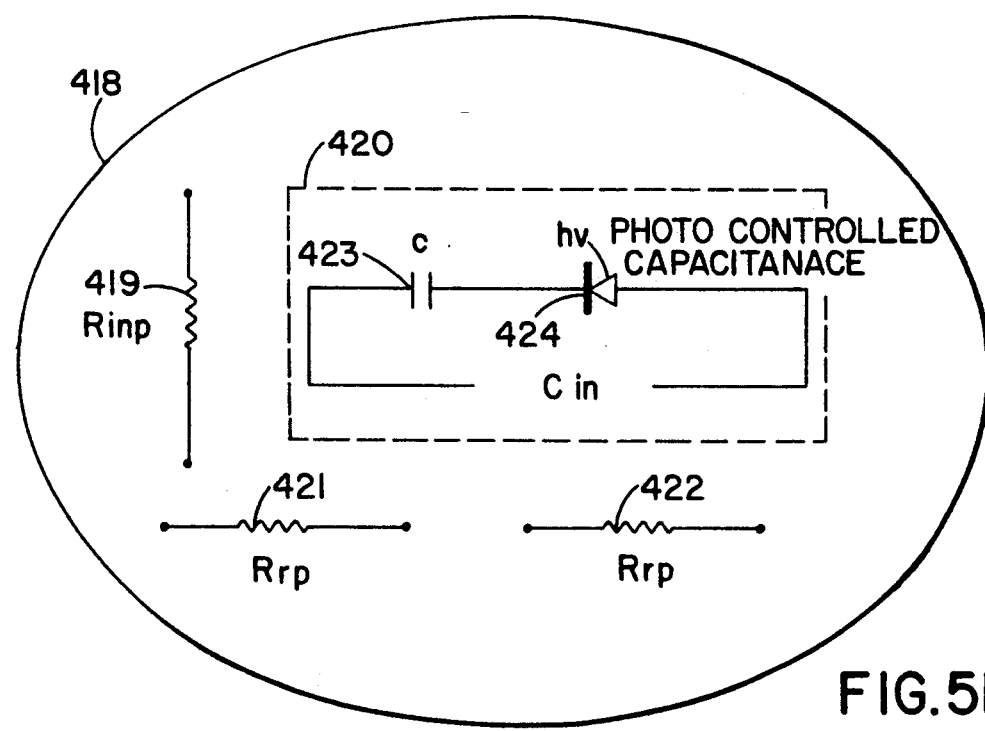
FIG. 5b is a circuit representation of an individual element in the photo interconnect and response array of the present invention.

As stated previously, the parallel network 222 can be located in the photo receptor array means 100 or in the photo interconnect and response array means 400. FIG. 5a illustrates the photo interconnect and response array means 400, and as can be seen from FIG. 5a, the photo interconnect and response array means 400 is comprised of a plurality of individual elements 401-418. FIG. 5b shows an enlarged view of element 418 of the photo interconnect and response array means 400. Here the parallel network 222 as shown in FIG. 4 is shown as discrete components. Input resistor 419, which is equivalent to input resistor 223 shown in FIG. 4, is a photo controlled resistor, and input capacitor 420, which is equivalent to input capacitor 224 shown in FIG. 4, is a photo controlled capacitance. The photo interconnect and response array element 418 as shown in FIG. 5b shows two additional resistors 421 and 422 which comprise the neuron amplifier disconnect means of the neural network 10. Basically, resistors 421 and 422 are photo controlled connectivity resistors which effectively operate to control the connectivities between the individual neuron amplifiers 201-205 as shown in FIG. 2. By proper manipulation of the incident radiation supplied by the photo stimulus means 600 shown in FIG. 1, either or both of the connectivity resistors 421 and/or 422 can be made high enough in resistance to effectively disconnect or isolate any of the neuron amplifiers 201-205 from the remaining neuron amplifiers 201-205 or low enough in resistance to provide all the neuron amplifiers 201-205 in the circuit for a given response. As an alternative approach, light activated switches can be utilized instead of photo controlled resistors. The manipulation of the incident radiation may take the form of reprogramming a computer controlled laser scanner by the system operator, or as simple as adding/removing light sources and lenses by the system operator.

Figure 6:
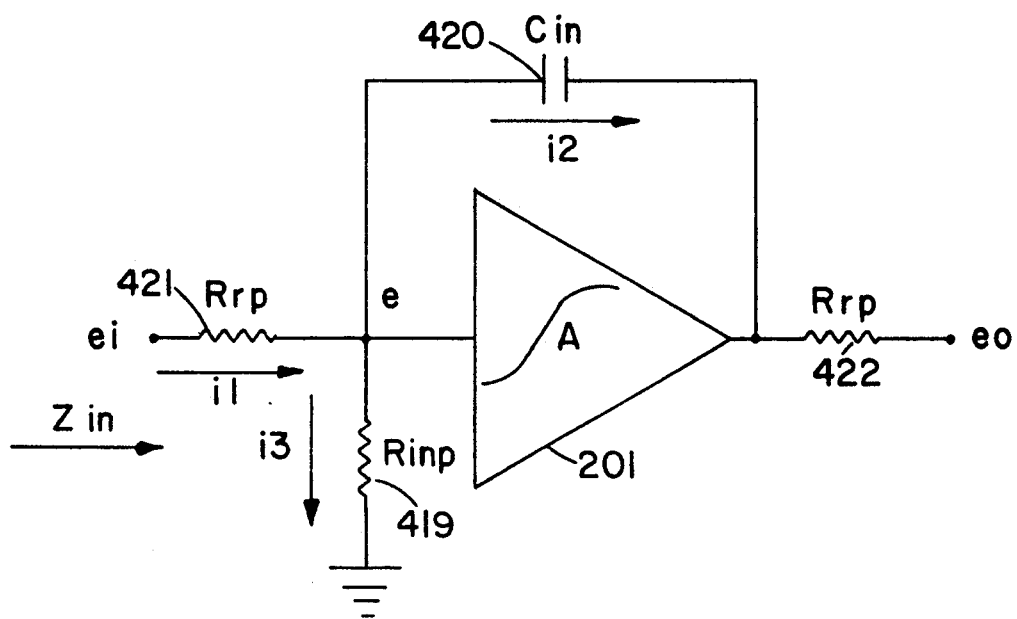
FIG. 6 is a circuit diagram of an individual neuron amplifier with connective resistances.

Referring now to FIG. 6 there is shown an enlarged view of the neuron amplifier 201 with the connectivity and temporal response elements 421, 422, 420, and 419 discussed above and shown in FIG. 5b. The photo controlled resistors 421 and 422 controls the input and output connection of the neuron amplifier 201 thereby establishing by the image control pattern supplied by the photo stimulus means 600 shown in FIG. 1 how each neuron amplifier 201-205 is to be connected in the network 10. The temporal response control of the neuron amplifier is governed by its input resistance 419 and its input capacitance 420. The capacitor 420 and the resistor 419 can be placed directly shunting the neuron amplifier 201 input or be incorporated into the local feedback element. For the input capacitor 420 it can be shown that for either location the only difference would be a fixed change of capacitance seen at the input. One would see the capacitance of capacitor 420 when capacitor 420 is placed across the input terminal and (1-A) times the capacitance of capacitor 420 when used as the local feedback element, where A is the open loop gain of the neuron amplifier 201. To utilize capacitor 420 it must be decoupled which is accomplished by placing a large value conventional capacitor 423, as shown in FIG. 5b, in series with this small depletion layer capacitor 424. When placed in the feedback path as shown in FIG. 6, the resultant capacitance at the input to the neuron amplifier 201 will be raised to (1-A)C. By exploiting this Miller Effect it is possible to control a wide range of response times, while placing input capacitor 420 at the input provides a lower range of controllable values.

Figure 7:
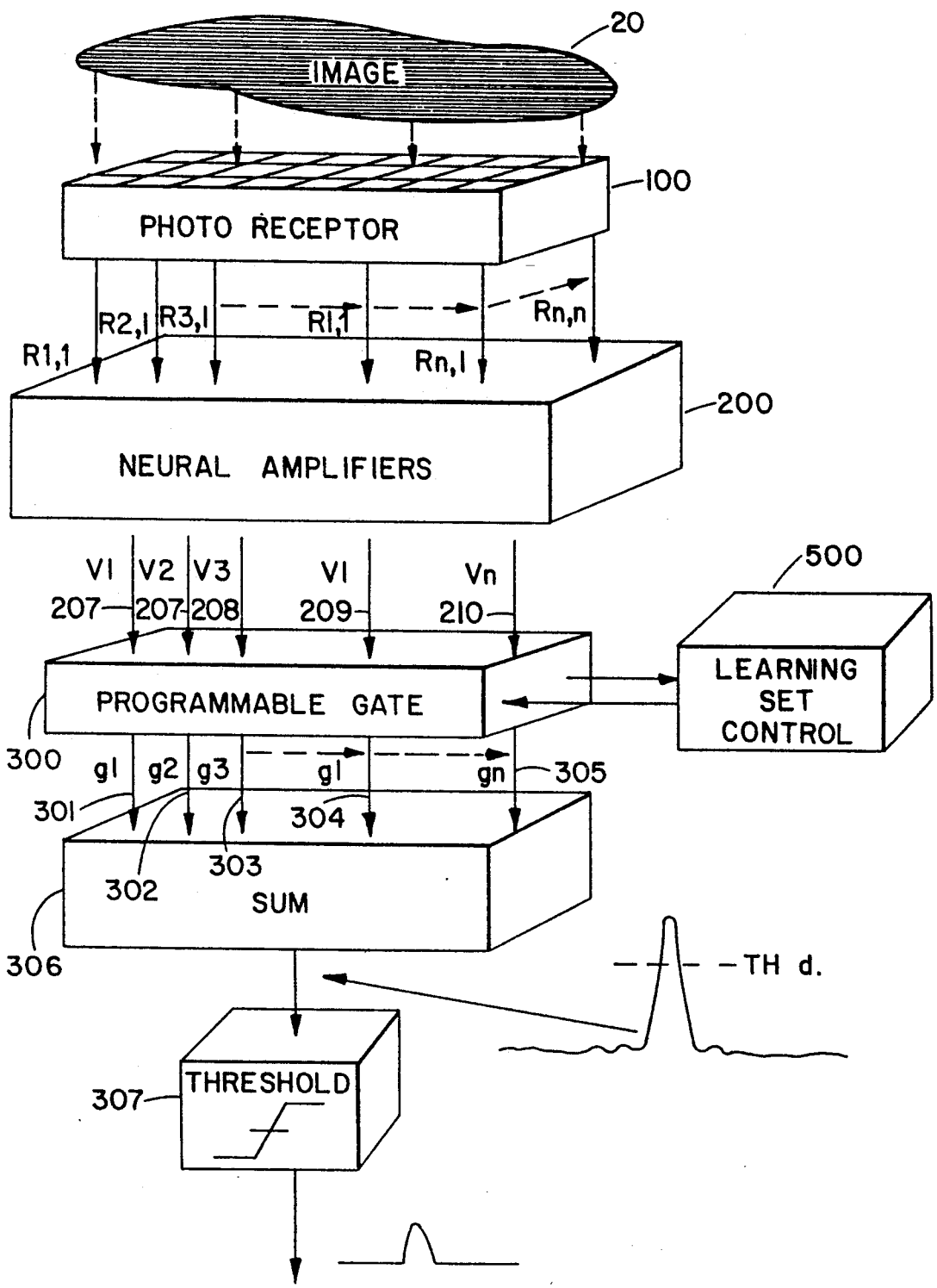
FIG. 7 is a flow diagram of the photo stimulated imaging neural network of the present invention.

A flow diagram of the network 10 is given in FIG. 7 where signal elements are separated to show the different signal operations. The image or object 20 formed on the photo receptor array means 100 provides the various synaptic couplings between the neuron amplifiers of the neuron amplifier array means 200 (the network connectivity and response is assumed to be set at some fixed configuration). The axon outputs 207-210 from the neuron amplifier array means 200 are in stable on or off binary states. Furthermore, each of these outputs, zeros or ones, insofar as position or level are equal contributors to the outcome of the network 10. Therefore, each output level and position is of equal weight so that the loss of one output will have only a small affect on the outcome of the process. This might be compared to a binary word where the loss of or error in a large bit such as the most significant bit (MSB) would have a drastic affect on the outcome. These equally weighted terms constitute the learning set and are stored in memory. The learning set can then be used to create a memory template for the gate array means 300. Gate array 300 is a programmable gate array which can store a variety of templates such that when a similar image appears sometime later it will produce a one for each memory coincidence and a zero for each memory difference. For an identical image, all ones will appear at the output gates 301-305. The programmable gate 300 is controlled by control means 500 which is a learning set control device responsible for the initialization inputs for the programmable gate 300. The outputs 301-305 of the programmable gate 300 are input to a summing means 306. A maximum output at the summing means 306 is invarient and corresponds to all ones at the input signifying a match with the input image. For comparison, the summing means 306 functions like a digital-to-analog converter but has equal weights on each of its inputs. The decision as to whether or not the input image is identified is set by a threshold device 307 which is adjusted to pass a predetermined level from the summing means 306. This threshold operation is continuously variable and replaces a much more complex gate structure that would be needed to form learning set templates in a digital implementation. The output of the threshold device 307 is the particular decision that will be utilized in some particular manner. The threshold device 307 can be a comparator circuit or the like.

The control means 500 provides the initialization values for the programmable gate 300 as stated previously, and in addition, it can provide various types of statistical voting schemes between the bits of the learning set. For example, if there is a 1-bit difference between the learning sets of two identical objects, the control means 500 can through a software routine vote out the one channel responsible for the 1-bit difference. Various voting schemes can be implemented depending upon the particular application. Once the control means 500 initializes the gate 300, subsequent learning sets reprogram the gate 300 from then on.

Figure 8:
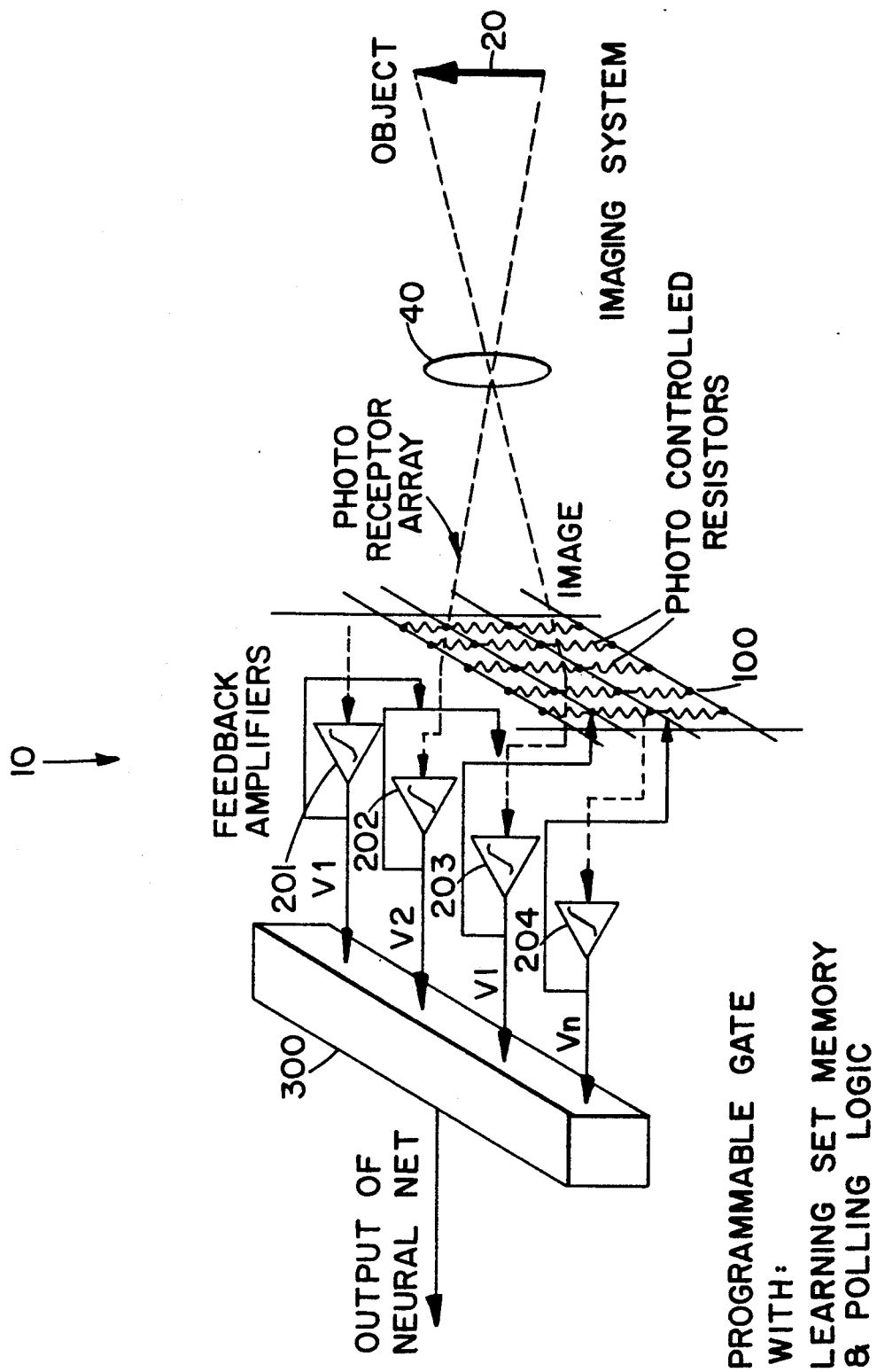
FIG. 8 is a schematic representation of the photo stimulated imaging neural network of the present invention.

A general arrangement for the neural network is shown in FIG. 8. The object 20 is imaged onto the photo receptor array means 100 by the imaging means 40 which here is shown as a lens. As stated previously, the lens can be replaced with a CRT, an intensifier or a laser scanner. When it is required to remove temporal variation of the image 20 due to scanning processes a light valve such as a Grumman Spatial Light Modulator can be used to transform the scanned image which would appear serially at a periodic rate (30 frames per second in TV) to an image without significant periodic fluctuations. Alternatively, the firing rate time constant of each neuron amplifier 201-204 can be adjusted as part of the input image or inserted as a dynamically controlled signal overlay pattern to set the pass band well below the periodic rate of the scanning system.

The photo receptor array means 100 is comprised of nxn photo resistors or their equivalent which are discrete elements for a limited size array or thin film deposited for larger arrays. The number of elements in the photo receptor array means 100 determines the resolution of the neural network 10, where simple geometric shapes require small numbers of elements as compared to complex objects requiring many elements.

Each element of the photo receptor array means 100 is connected to the designated neuron amplifiers 201-204 as indicated in FIG. 2. The axon output of the individual neuron amplifiers is inputted to a single gate 300 structure which is preprogrammed from a previous learning set. Alternatively, a programmable gate array means 300 with sufficient memory is used to store learning sets and sequentially access these sets polling the neuron amplifier states to determine the nature of the input stimulus.

The programmable gate 300 is a standard digital circuit component that can be realized in a variety of technologies including CMOS, NMOS and Gallium Arsenide. The particular technology chosen depends upon a variety of factors including the desired operating speed of the system. The summing means 306 and the threshold means 307 are also standard electrical components.

Although shown and described in what are believed to be the most practical and preferred embodiments, it is apparent that departures from specific methods and designs described and shown will suggest themselves to those skilled in the art and may be used without departing from the spirit and scope of the invention. The present invention is not restricted to the particular embodiments described and illustrated, but should be construed to cover all modifications that may fall within the scope of the appended claims.

What is claimed is:

1. A photo stimulated imaging neural network for processing an image which is directly imaged as an input onto the neural network, comprising:
   a direct imaging means utilizing light from a scene or an image of the scene for impressing an input image of light from the scene or image directly on said neural network as an input into said neural network;
   a photo receptor array means for converting said input image from said imaging means into a pattern of photo controlled electrical coupling to produce a plurality of electrical dendrite input signals; and
   a neuron amplifier array means having a plurality of individual electrical neuron amplifiers, said neuron amplifier array means providing a plurality of electrical axon output signals to a programmable gate array means in response to receipt of and stimulation by said plurality of electrical dendrite input signals from said photo receptor array means, said programmable gate array means comprising an array of electrical gates which is configured by programming to perform a particular logical operation.

2. The photostimulated imaging neural network according to claim 1 wherein said imaging means radiometrically forms an image directly on said photo receptor array means.

3. The photo stimulated imaging neural network according to claim 2 wherein said imaging means is a lens.

4. The photo stimulated imaging neural network according to claim 2 wherein said imaging means is a cathode ray tube.

5. The photo stimulated imaging neural network according to claim 2 wherein said imaging means is an intensifier.

6. The photo stimulated imaging neural network according to claim 2 wherein said imaging means is a laser scanner.

7. The photo stimulated imaging neural network according to claim 1 wherein said photoreceptor array means comprises:
   a plurality of synaptic photo controlled resistors which provide synapse-like interconnections between said plurality of individual neuron amplifiers, said synaptic photo controlled resistors emulating biological synaptic couplings in response to said stimulus data from said imaging means;

a voltage supply means for providing an operating voltage to each of said individual neuron amplifiers; and a plurality of current limiting photo controlled resistors connected between said voltage supply means and said plurality of synaptic photo controlled resistors.

8. The photo stimulated imaging neural network according to claim 7 wherein said plurality of synaptic photo controlled resistors and said plurality of current limiting photocontrolled resistors are photo field effect transistors.

9. The photo stimulated imaging neural network according to claim 7 wherein said plurality of synaptic photo controlled resistors and said plurality of current limiting photo controlled resistors are bipolar photo transistors.

10. The photo stimulated imaging neural network according to claim 7 wherein said plurality of synaptic photo controlled resistors and said plurality of current limiting photo controlled resistors are photodiodes.

11. The photo stimulated imaging neural network according to claim 7 wherein said plurality of synaptic photo controlled resistors respond to incident radiation wave length and intensity with a specific value of resistance thus determining the feedback and coupling pattern between the plurality of individual neuron amplifiers.

12. The photo stimulated imaging neural network according to claim 11 wherein each synaptic photo controlled resistor of said plurality of synaptic photo controlled resistors provides equal resistance when stimulated by equal intensity light.

13. The photo stimulated imaging neural network according to claim 12 wherein said plurality of synaptic photo controlled resistors provides feedback and coupling from an output of one individual neuron amplifier to an input of all other individual neuron amplifiers in said plurality of individual neuron amplifiers.

14. The photo stimulated imaging neural network according to claim 13 wherein said plurality of individual neuron amplifiers each have an inhibitory negative feedback axon output and an enabling positive feedback axon output, said enabling positive feedback axon outputs are connected to said gate array.

15. The photo stimulated imaging neural network according to claim 14 wherein said inhibitory negative feedback axon outputs and said enabling positive feedback axon outputs of each individual neuron amplifier are coupled by said synaptic photo controlled resistors to all remaining individual neuron amplifiers resulting in a number of couplings one less then that of the number of said plurality of individual neuron amplifiers.

16. The photo stimulated imaging neural network according to claim 15 wherein said plurality of individual neuron amplifiers settle into a set of stable states based on the unique coupling and feedback which is a function of said stimulus data from said imaging means, said set of stable states constitutes a specific learning set.

17. The photo stimulated imaging neural network according to claim 16 wherein said learning set consists of binary states which insofar as position or level are equal contributors to said learning set, said learning set is stored and utilized by said gate array which is controlled by a control means, said gate array outputs a plurality of output gates to a summing means wherein said output gates are summed and passed through a threshold device for comparison or storage.

18. The photo stimulated imaging neural network according to claim 16 wherein said plurality of individual neuron amplifiers settle into said set of stable states in a non-linear fashion as a function of a predetermined firing rate time constant and sigmoid response of each individual neuron amplifier.

19. The photo stimulated imaging neural network according to claim 18 wherein said sigmoid response of each individual neuron amplifier provides each amplifier with remote cutoff and saturation transfer characteristics.

20. The photo stimulated imaging neural network according to claim 19 wherein said sigmoid response is provided by a local parallel feedback network comprised of a first diode/zener diode branch which conducts from said input to said individual neuron amplifier to said output of said individual neuron amplifier and a second diode/zener diode branch which conducts in an opposite direction as that from said first branch.

21. The photo stimulated imaging neural network according to claim 18 wherein said predetermined firing rate time constant of each individual neuron amplifier determines the duration of time in which it takes said individual neuron amplifier to settle into a stable state after being excited.

22. The photo stimulated imaging neural network according to claim 21 wherein said predetermined firing rate time constant is provided by a parallel network consisting of a resistor and capacitor connected across each said individual neuron amplifier.

23. The photo stimulated imaging neural network according to claim 22 wherein said resistor and capacitor of said parallel network are photo controlled.

24. The photo stimulated imaging neural network according to claim 23 wherein said photo controlled capacitor is a photo controlled depletion layer capacitance of a pn junction.

25. The photo stimulated imaging neural network according to claim 21 wherein said photo stimulated imaging neural network further comprises:

a photo interconnect and response array for providing connectivity and temporal control for said network in response to a plurality of external stimulus signals; and a photo stimulus means for providing a light pattern which inpinges on said photo interconnect and response array to form an operational network, said light pattern constitutes said plurality of external stimulus signals.

26. The photo stimulated imaging neural network according to claim 25 wherein said photo interconnect and response array comprises a plurality of elements each comprising:

at least one neuron amplifier disconnect means for controlling the input and output connection of each of said individual neuron amplifiers; and a parallel network consisting of a resistor and capacitor which is connected across each of said individual neuron amplifiers.

27. The photo stimulated imaging neural network according to claim 26 wherein said neuron amplifier disconnect means comprises two photo controlled resistors, wherein one photo controlled resistor is connected across the input of each of said individual neuron amplifiers and the second is connected across said output of each of said individual neuron amplifiers.

28. The photo stimulated imaging neural network according to claim 27 wherein said predetermined firing rate time constant is provided by said parallel network of said photo interconnect and response array.

29. The photo stimulated imaging neural network according to claim 28 wherein said resistor and capacitor are photo controlled.

30. The photo stimulated imaging neural network according to claim 27 wherein said neuron amplifier disconnect means is operable to disconnect any or all of said individual neuron amplifiers thereby determining how many of said individual neuron amplifiers contribute to said learning set.

31. A photostimulated imaging neural network for processing an image which is directly imaged as an input onto the neural network, comprising:

a direct imaging means utilizing light from a scene or an image of the scene for impressing an input image of light from the scene or image directly on said neural network as an input into said neural network;

a combined photo receptor and photo interconnect and response array means for converting said input image from said imaging means into a pattern of photo controlled electrical couplings to produce a plurality of electrical dendrite input signals, and for providing connectivity and temporal control for said network in response to a plurality of photo stimulus signals provided by a photo stimulus means;

a neuron amplifier array means having a plurality of individual electrical neuron amplifiers, said neuron amplifier array means providing a plurality of electrical axon output signals to a programmable gate array means in response to receipt of and stimulation by said plurality of electrical dendrite input signals from said combined photo receptor and photo interconnect and response array means, said programmable gate array means comprising an array of electrical gates which is configured by programming to perform a particular logical operation; and a photo stimulus means for providing a light pattern which impinges on said combined photo receptor and photo interconnect and response array to form an operational network, said light pattern constituting said plurality of photo stimulus signals.

32. A photo stimulated imaging neural network according to claim 31 wherein said imaging means radiometrically images said data onto said photo receptor and photo interconnect and response array means.

33. The photo stimulated imaging neural network according to claim 32 wherein said imaging means is a lens.

34. The photo stimulated imaging neural network according to claim 32 wherein said imaging means is a cathode ray tube.

35. The photo stimulated imaging neural network according to claim 32 wherein said imaging means is an intensifier.

36. The photo stimulated imaging neural network according to claim 32 wherein said imaging means is a laser scanner.

37. The photo stimulated imaging neural network according to claim 31 wherein said photo receptor and photo interconnect and response array means comprises:

a plurality of synaptic photo controlled resistors which provide synapse-like interconnections between said plurality of individual neuron amplifiers, said synaptic photo controlled resistors emulating biological synaptic couplings in response to said stimulus data from said imaging means;

a voltage supply means for providing an operating voltage to each of said individual neuron amplifiers;

a plurality of a current limiting photo controlled resistors connected between said voltage supply means and said plurality of synaptic photo controlled resistors;

a neuron amplifier disconnect means for controlling the input and output connection of each individual neuron amplifier; and a parallel network consisting of a resistor and capacitor which is connected across each of said individual neuron amplifiers.

38. The photo stimulated imaging neural network according to claim 37 wherein said predetermined firing rate time constant is provided by said parallel network of said photo receptor and photo interconnect and response array means.

39. The photo stimulated imaging neural network according to claim 37 wherein said plurality of synaptic photo controlled resistors and said plurality of current limiting photo controlled resistors are photo field effect transistors.

40. The photo stimulated imaging neural network according to claim 37 wherein said plurality of synaptic photo controlled resistors and said plurality of current limiting photo controlled resistors are bipolar photo transistors.

41. The photo stimulated imaging neural network according to claim 37 wherein said plurality of synaptic photo controlled resistors and said plurality of current limiting photo controlled resistors are photo diodes.

42. The photo stimulated imaging neural network according to claim 37 wherein said plurality of synaptic photo controlled resistors respond to incident radiation wave length and intensity with a specific value of resistance thus determining the feedback and coupling pattern between the plurality of individual neuron amplifiers.

43. The photo stimulated imaging neural network according to claim 42 wherein each synaptic photo controlled resistor of said plurality of synaptic photo controlled resistors provides equal resistance when stimulated by equal intensity light.

44. The photo stimulated imaging neural network according to claim 43 wherein said plurality of synaptic photo controlled resistors provide feedback and coupling from an output of one individual neuron amplifier to an input of all other individual neuron amplifiers in said plurality of individual neuron amplifiers.

45. The photo stimulated imaging neural network according to claim 37 wherein said neuron amplifier disconnect means comprises two photo controlled resistors, wherein one photo controlled resistor is connected across said input of each of said individual neuron amplifier and the second is connected across said output of each of said individual neuron amplifiers.

46. The photo stimulated imaging neural network according to claim 45 wherein said plurality of individual neuron amplifiers each have an inhibitory negative feedback axon output and an enabling positive feedback axon output, said enabling positive feedback axon outputs are connected to said gate array.

47. The photo stimulated imaging neural network according to claim 46 wherein said inhibitory negative feedback axon outputs and said enabling positive feedback axon outputs of each individual neuron amplifier are coupled by said synaptic photo resistors to all remaining individual neuron amplifiers resulting in a number of couplings one less than that of the number of said plurality of individual neuron amplifiers.

48. The photo stimulated imaging neural network according to claim 47 wherein said plurality of individual neuron amplifiers settle into a set of stable states based on the unique coupling and feedback which is a function of said stimulus data from said imaging means, said stable states constitute a specific learning set.

49. The photo stimulated imaging neural network according to claim 48 wherein said learning set consists of binary states which insofar as position or level are equal contributors to said learning set, said learning set is stored and utilized by said gate array which is controlled by a control means, said gate array outputs a plurality of output gates to a summing means wherein said output gates are summed and passed through a threshold device for comparison or storage.

50. The photo stimulated imaging neural network according to claim 49 wherein said plurality of individual neuron amplifiers settle into said set of stable states in a non-linear fashion as a function of a predetermined firing rate time constant and sigmoid response of each individual neuron amplifier.

51. The photo stimulated imaging neural network according to claim 50 wherein said sigmoid response of each individual neuron amplifier provides each amplifier with remote cutoff and saturation transfer characteristics.

52. The photo stimulated imaging neural network according to claim 50 wherein said predetermined firing rate time constant of each individual neuron amplifier determines the duration of time in which it takes said individual neuron amplifier to settle into a stable state after being excited.

53. A method for processing an image which is directly imaged as an input onto the neural network, comprising the steps of:
forming an image utilizing light from a scene or an image of the scene for impressing an input image of light from the scene or image directly on said neural network as an input into said neural network;
converting said input image into a pattern of photo controlled electrical couplings to produce a plurality of electrical dendrite input signals; and
providing a plurality of electrical axon output signals to a programmable gate array means in response to receipt of and stimulation by said plurality of electrical dendrite input signals, said programmable gate array means comprising an array of electrical gates which is configured by programming to perform a particular logical operation.

54. The method according to claim 53 wherein said image forming step includes radiometrically imaging said stimulus data onto said photo receptor means.

55. A method according to claim 54 wherein said converting step comprises the steps of:
passing said stimulus data through a plurality of synaptic photo controlled resistors that comprise said photo receptor array and which provide synapse-like interconnections between a plurality of individual neuron amplifiers, said plurality of synaptic photo controlled resistors emulating biological synaptic couplings in response to said stimulus data;
providing feedback between said plurality of individual neuron amplifiers; and
supplying an initialization voltage to said plurality of individual neuron amplifiers.

56. The method according to claim 55 wherein said step of providing a plurality of axon output signals step comprises the steps of:
converting said plurality of electrical dendrite input signals into said plurality of axon output signals by passing said input signals through said plurality of individual neuron amplifiers wherein through said synaptic couplings and feedback, said plurality of neuron amplifiers settle into a set of stable states; and
providing said set of stable states to said gate array means wherein they are electronically summed for further learning functions and comparisons.

57. The method according to claim 56 wherein said method further comprises the steps of:
controlling the input and output connections of each neuron amplifier of said plurality of individual neuron amplifiers; and
controlling the temporal response of said photo stimulated imaging neural network.

58. The method according to claim 57 wherein said controlling the input and output connections step comprises switching any of said individual neuron amplifiers from said plurality of individual neuron amplifiers in and out of said photo stimulated imaging neural network.

59. The method according to claim 57 wherein said controlling the temporal response step comprises introducing a firing rate time constant into said photo stimulated imaging neural network.

* * * * *

UNITED STATES PATENT AND TRADEMARK OFFICE
CERTIFICATE OF CORRECTION

PATENT NO. : 5,255,362
DATED : October 19, 1993
INVENTOR(S) : Robert W. Brandstetter, et al.

It is certified that error appears in the above-indentified patent and that said Letters Patent is hereby corrected as shown below:

Column 10, line 34: after "145" insert --.--

Column 15, line 60, Claim 16: after "data" insert --of the direct image input--

Signed and Sealed this

Sixteenth Day of August, 1994

Attest:

BRUCE LEHMAN

Attesting Officer

Commissioner of Patents and Trademarks